United States Patent
Kaku et al.

(10) Patent No.: US 7,269,215 B2
(45) Date of Patent: Sep. 11, 2007

(54) EQUALIZATION PROCESSING METHOD AND THE APPARATUS FOR PERIODIC FLUCTUATION OF TRANSMISSION LINE CHARACTERISTIC

(75) Inventors: Takashi Kaku, Kawasaki (JP); Ryoji Okita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 599 days.

(21) Appl. No.: 10/024,606

(22) Filed: Oct. 30, 2001

(65) Prior Publication Data

US 2002/0196095 A1 Dec. 26, 2002

(30) Foreign Application Priority Data

Jun. 20, 2001 (JP) ............... 2001-186275

(51) Int. Cl.
*H03H 7/30* (2006.01)
*H04B 3/14* (2006.01)

(52) U.S. Cl. .................. 375/231; 333/28 R
(58) Field of Classification Search ........... 375/229, 375/376, 316, 231, 257; 333/18, 28, 28 R; 340/659, 310.11, 310.13; 708/300, 311, 708/312, 322, 323
See application file for complete search history.

(56) References Cited

U.S. PATENT DOCUMENTS

| | | | | |
|---|---|---|---|---|
| 4,334,312 A | * | 6/1982 | Yoshida | 375/294 |
| 4,694,469 A | * | 9/1987 | Kaku et al. | 375/231 |
| 4,849,996 A | * | 7/1989 | Kamerman | 375/371 |
| 4,970,602 A | * | 11/1990 | Yoshio | 386/85 |
| 5,048,055 A | * | 9/1991 | Creigh et al. | 375/229 |
| 5,121,266 A | * | 6/1992 | Ito et al. | 360/65 |
| 5,347,230 A | * | 9/1994 | Noro | 330/297 |
| 5,424,849 A | * | 6/1995 | Yamashita et al. | 386/89 |
| 5,452,344 A | * | 9/1995 | Larson | 340/538.11 |
| 5,708,703 A | * | 1/1998 | Nagaraj | 379/340 |
| 6,219,334 B1 | | 4/2001 | Kazumi et al. | |
| 6,438,185 B1 | * | 8/2002 | Huttunen | 375/350 |
| 6,831,958 B1 | * | 12/2004 | Rouvellou | 375/350 |
| 6,912,248 B1 | * | 6/2005 | Wakabayashi | 375/229 |
| 7,203,230 B2 | * | 4/2007 | Vaananen | 375/229 |

FOREIGN PATENT DOCUMENTS

| | | | |
|---|---|---|---|
| EP | 1271867 | * | 1/2003 |
| JP | 58073252 A | * | 5/1983 |

OTHER PUBLICATIONS

Harald Dalichau, et al. Description of the Technology and Comparison of the Performance of two different Approaches for a Powerline Modem in the CENELEC-BAND, Apr. 5, 2000-Apr. 7, 2000, pp. 1-7, PolyTrax Information Technology AG, Munchen, Germany [Online] www.polytrax.com/images/press/1imerick.pdf.>.

(Continued)

*Primary Examiner*—Tesfaldet Bocure
(74) *Attorney, Agent, or Firm*—Katten Muchin Roseman LLP

(57) ABSTRACT

A method used in equalization processing is provided, in which a reference signal is received and a change point of transmission line characteristics is detected. A basic frequency signal of fluctuation period of the transmission line characteristics is extracted, and vectorized. The vector is adjusted such that vectors corresponding to two change points become symmetrical with respect to X axis. Then, fluctuation interval of transmission line characteristics is judged by comparing X component of the vector with a reference value. As a result, equalization processing is performed in accordance with the fluctuation.

10 Claims, 14 Drawing Sheets

OTHER PUBLICATIONS

S. Ramseiser, et al. MV and LV Powerline Communications: New Proposed IEC Standards, IEEE, vol. 1, Apr. 11, 1999, pp. 235-239, ISBN: 0-7803-5516-4, IEEE Transmission and Distribution Conference, New Orleans, LA, IEEE Transmission and Distribution Conference, New York, NY.

K. Blackard, et al. Measurements and Models of Radio Frequency Impulsive Noise for Indoor Wireless Communications, IEEE Journal on Selected Areas in Communications, IEEE Journal on Selected Areas in Communications, Sep. 1, 1993, pp. 991-1001, XP00400009, ISSN: 0733-8716 IEEE Service Center, Piscataway, NJ, US.

European Search Report dated Apr. 16, 2007 for the corresponding European Patent Application EP 01 12 4363.

* cited by examiner

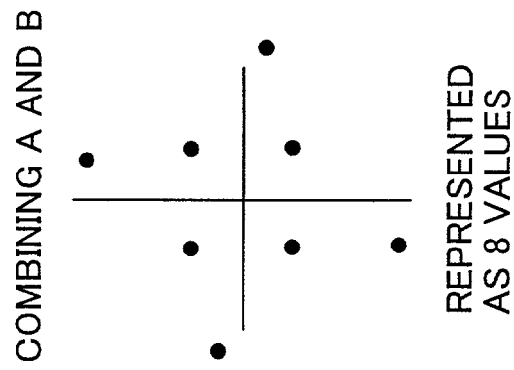
FIG.4C
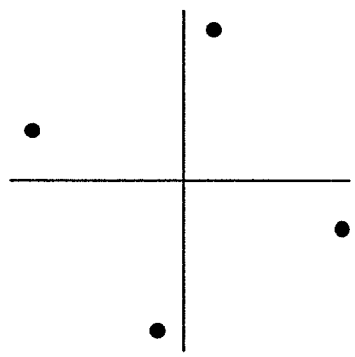
FIG.4B
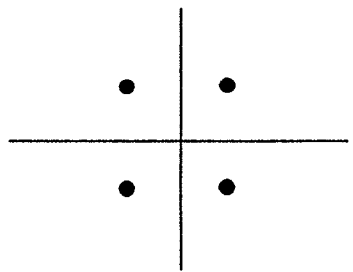
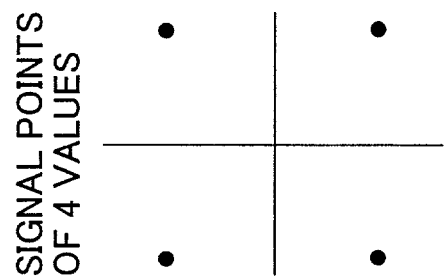
FIG.4A

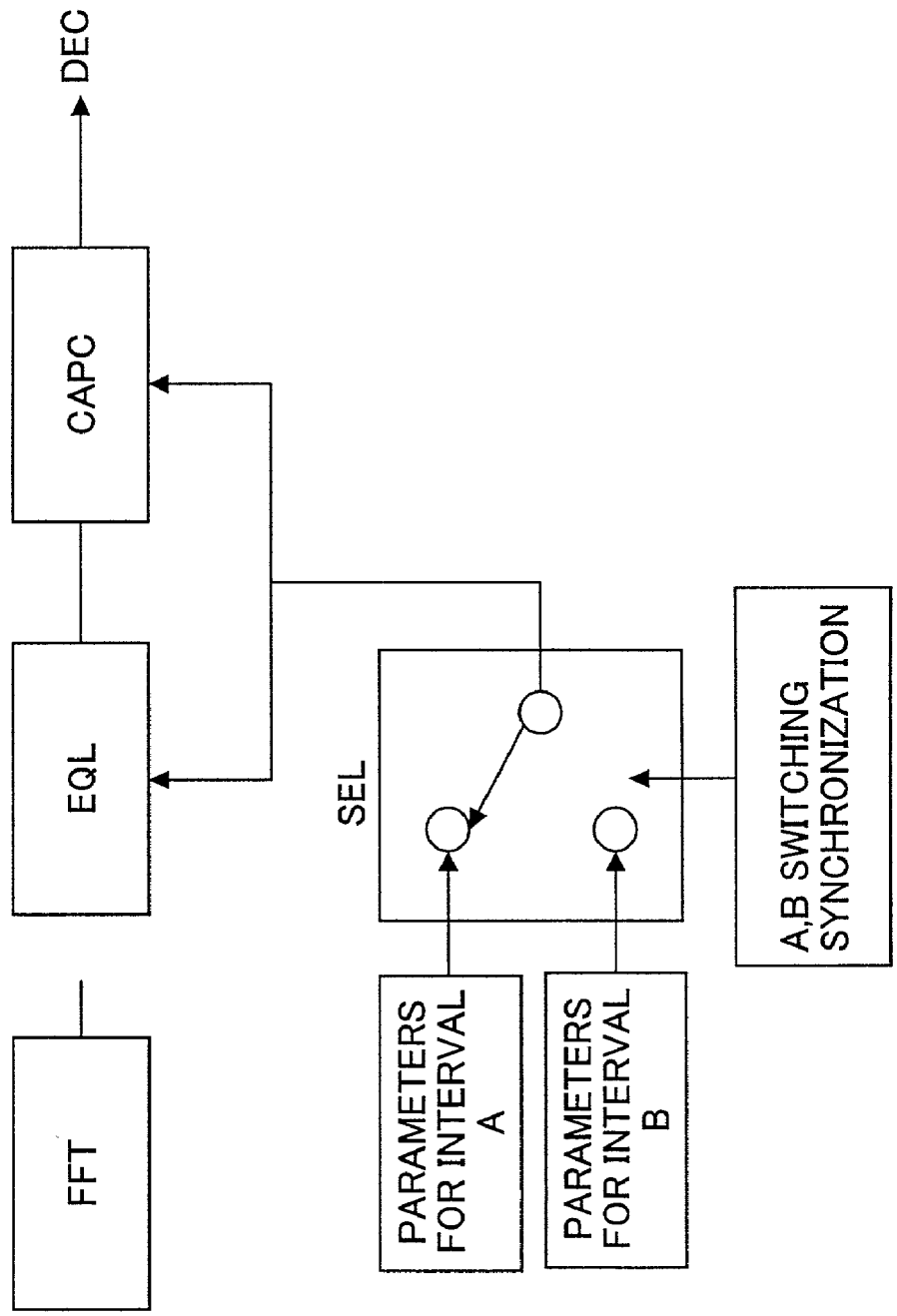

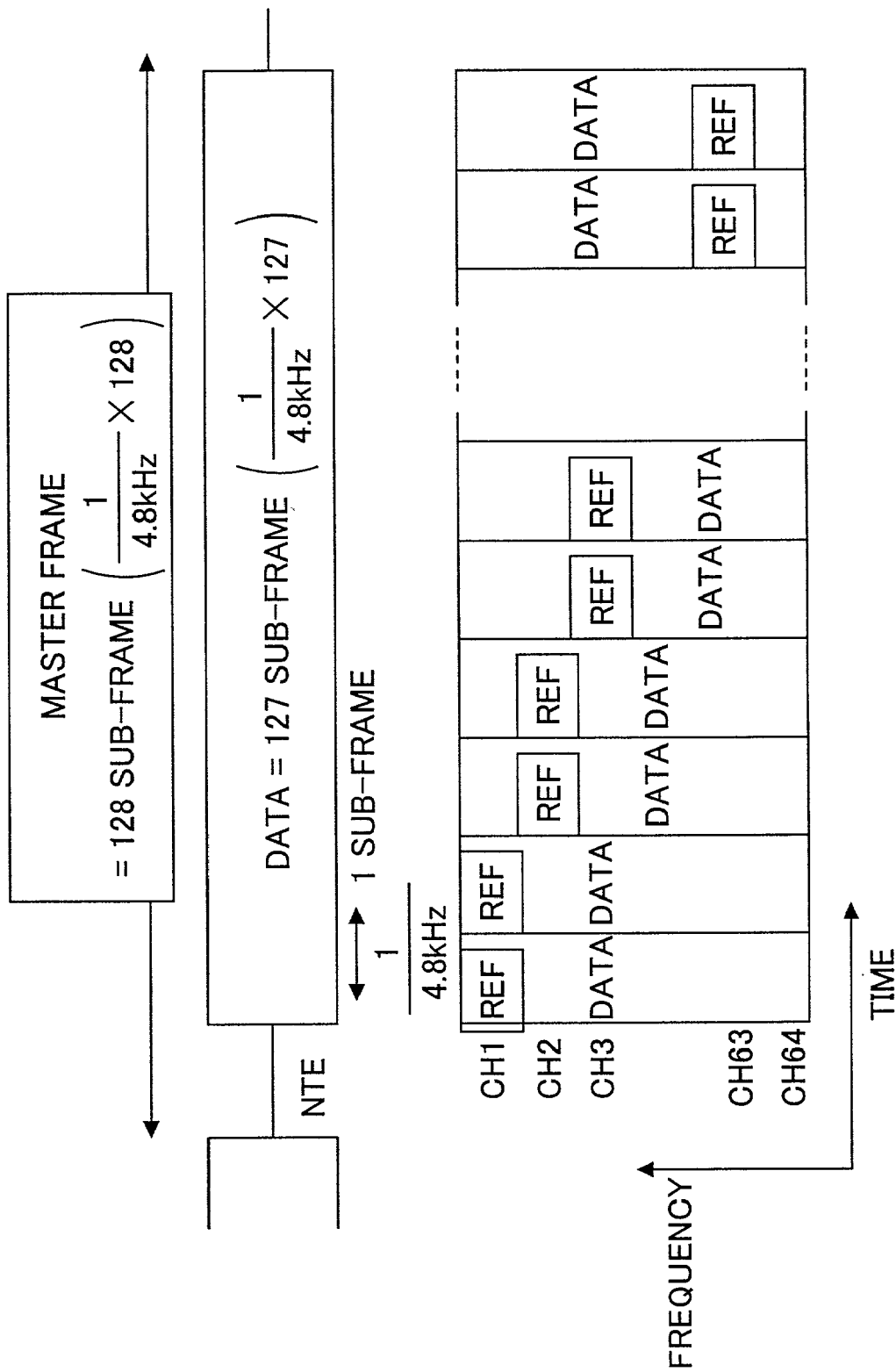

REF SIGNAL POINT

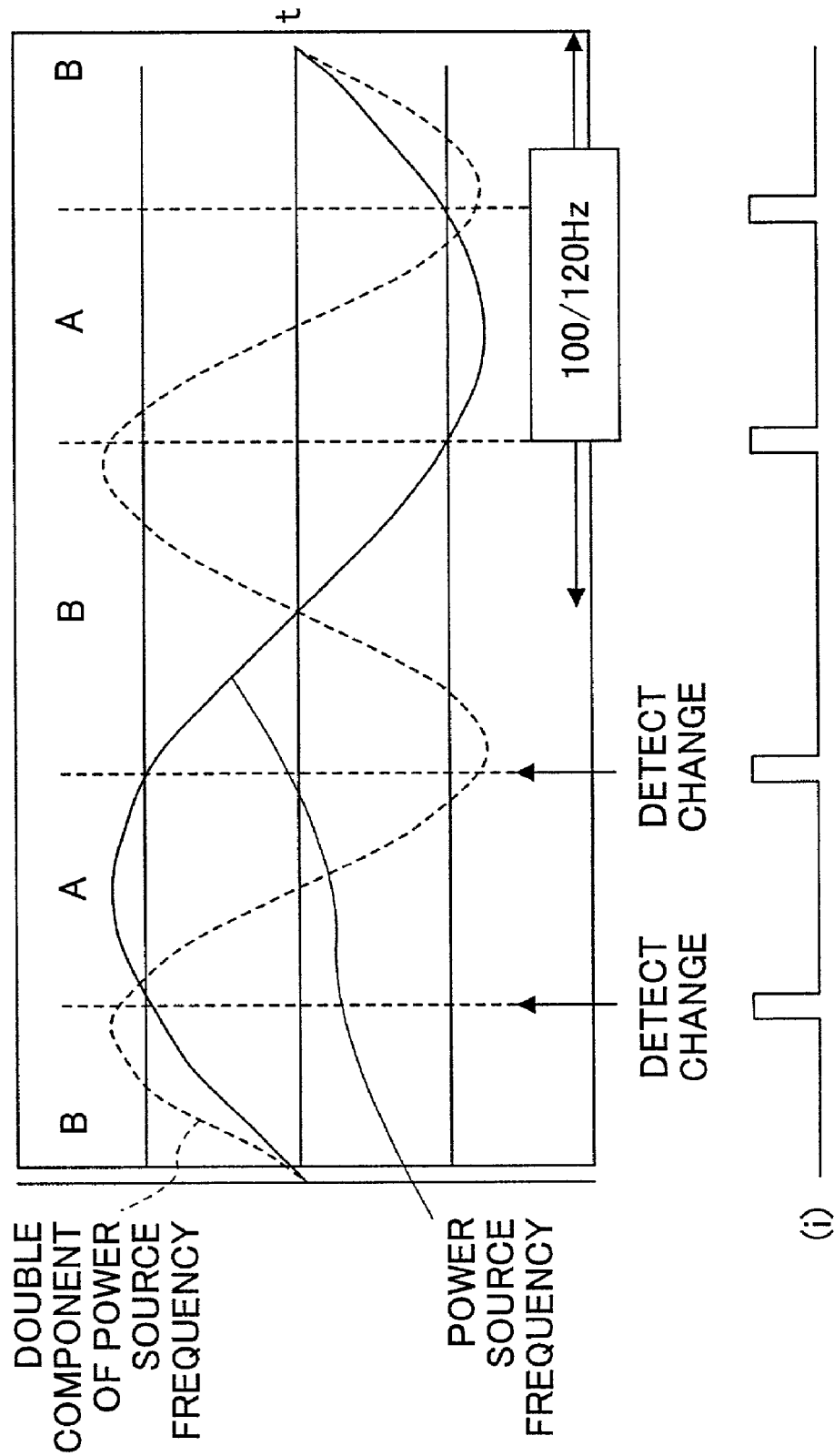

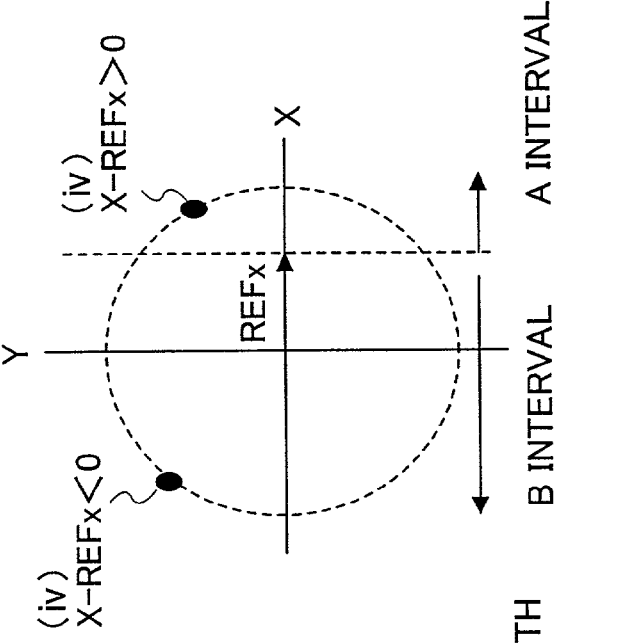
FIG.10A BEFORE PHASE ADJUSTMENT
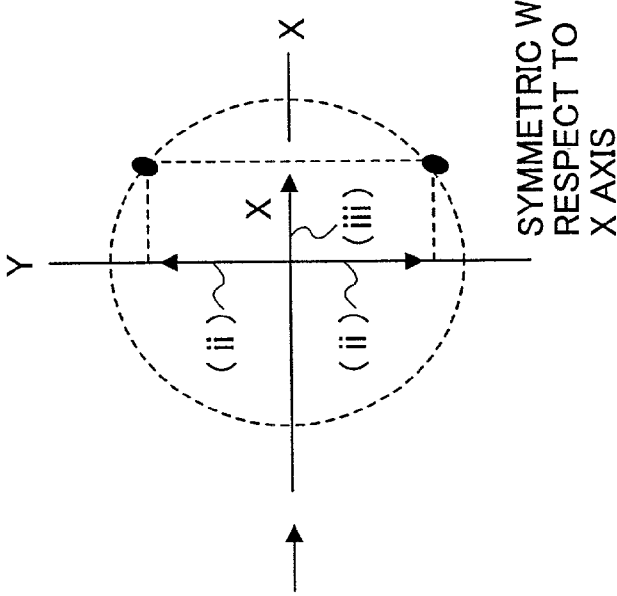
FIG.10B AFTER PHASE ADJUSTMENT
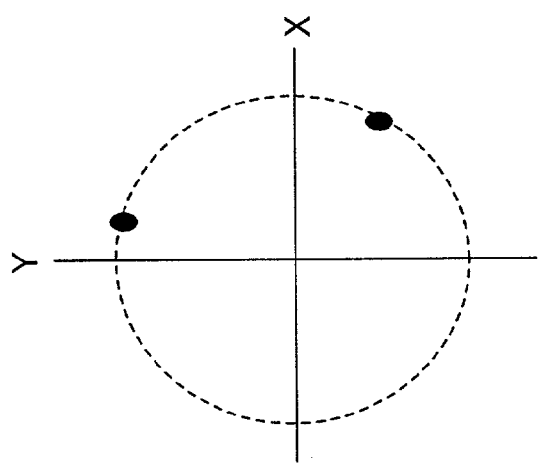
FIG.10C A,B INTERVAL JUDGMENT

EQUALIZATION PROCESSING METHOD AND THE APPARATUS FOR PERIODIC FLUCTUATION OF TRANSMISSION LINE CHARACTERISTIC

BACKGROUND OF THE INVENTION

1. Field of the Invention

The present invention relates to an equalization processing method and an equalization processing apparatus for periodical fluctuation of transmission line characteristics.

More particularly, an equalization characteristic changing method and the apparatus for detecting fluctuation of transmission line characteristics and changing the equalization characteristic according to the fluctuation of transmission line characteristics, wherein the fluctuation of transmission line characteristics periodically occurs, in a modem and the like for a power line communication, due to on-off of internal elements of a household electrical appliance which is connected to a power line such as a switching power source and the like.

2. Description of the Related Art

FIG. 1 shows a configuration example of a power line communication system. As shown in the figure, a high voltage power line 8-2 of 6.6 kV is provided between a distribution substation 8-1 and a pole transformer 8-3, and a low voltage distribution line 8-4 of 100V/200V and a service line 8-5 are provided between the pole transformer 8-3 and a house 8-6.

In the power line communication system, an optical fiber is provided in parallel with the high voltage distribution line 8-2 between an access node 8-11 in the distribution substation 8-1 and a modem in the pole transformer 8-3 so that an optical signal is transmitted. A communication signal is transmitted between the pole transformer 8-3 and a modem plugged in a wall outlet in the house 8-6 via the low voltage distribution line 8-4 of 100V/200V, the service line 8-5 and an interior distribution line 8-7.

In such a power line communication system, the low voltage distribution line 8-4 can be regarded as inductor for the modem in the pole transformer 8-3. In addition, the service line 8-5 which is connected to the low voltage distribution line 8-4 and the interior distribution line 8-7 can be regarded as a condenser. In addition, household electrical appliances show large capacitive load since condensers for preventing noise are connected between AC 100V lines.

As a result, the low voltage distribution line 8-4 is regarded as a low-pass filter (LPF) by the pole transformer 8-3 so that there is a case where a receive signal of the modem connected to the interior distribution line 8-7 is buried in noise since high frequency component is largely attenuated. On the other hand, low frequency component is not much attenuated comparing with the high frequency component. However, communication quality of the low frequency component degrades since random noise (colored noise) is released from switching power sources or inverter circuits of the household electrical appliances so that the low frequency component is also buried in large noise. Therefore, taking measures against the noise is necessary for realizing high speed data communication by the power line carrier.

For taking measures against degradation of the receive signal, frequency modulation (FM), frequency-shift keying (FSK), phase-shift keying (PSK) and the like which are said to be strong for noise are adopted conventionally as modulation method of the modem for power line communication. However, since noise level of power line is high, thus, applications which are realized by these modulation methods are limited to low speed applications under 1200 bps.

In addition, spread spectrum technology has been used for the power line communication. However, transmission capacity decreases remarkably when S/N value becomes minus under white noise environment. Thus, data can be sent at 100 kbps at the maximum, and communication is interrupted at worst. In addition, an attempt has been made to apply a technology to avoid carrier band in which noise is high, by using OFDM (Orthogonal Frequency Division Multiplexing) which uses multi-carrier modulation method.

However, the switching power sources in the household electrical appliance and the inverter circuits tend to increase. Conventional technology can be used for low speed communication even when noise and fluctuation of transmission line characteristics due to switching of the power sources and the inverter circuits occurs. However, it is not possible to realize the power line communication at high speed of several Mbps.

The switching power sources and the inverter circuits in the household electrical appliance are more and more increasingly used. In addition, condensers are connected to 100V power source lines for preventing noise so that capacitive load is increasing. Under these circumstances, it is not enough to avoid noise for communication in the way as conventional technology. On the other hand, it is more effective to realize high speed communication by actively coping with the occurrence of noise and fluctuation of transmission line characteristics so as to increasing receiving accuracy of a signal.

SUMMARY OF THE INVENTION

It is an object of the present invention to improve accuracy for receiving signals by preventing degradation of receiving signals.

The above object is achieved by a method used in equalization processing, including the steps of:

extracting information on fluctuation of transmission line characteristics which fluctuate periodically on the basis of a receive signal; and performing equalization processing while switching equalization characteristics in accordance with the fluctuation of transmission line characteristics.

BRIEF DESCRIPTION OF THE DRAWINGS

Other objects, features and advantages of the present invention will become more apparent from the following detailed description when read in conjunction with the accompanying drawings, in which:

FIGS. 4A-C show examples of signal points transmitted by the power line in which the transmission line characteristics fluctuate periodically;

FIG. 6 shows a second embodiment of the present invention;

FIG. 7A shows a transmission frame configuration according to the present invention for detecting transmission line characteristic fluctuation;

FIG. 9B is for explaining the pulse signal (i);

FIGS. 10A-10C show an example of phase adjustment and interval judgment for fluctuation period signal vector;

DETAILED DESCRIPTION OF THE PREFERRED EMBODIMENTS

The inventors contrived an invention in which high speed communication is realized by canceling low band noise component, and regenerating buried receive signal even when S/N value is minus, which was filed as Japanese patent application No. 2000-359949 "noise removing method and apparatus". According to this invention, noise component of dominant bandwidth is removed from noise which is regarded as colored noise from a macroscopic viewpoint so that S/N is converted to plus. As a result, receive signal buried in the noise is extracted.

Figure 1:
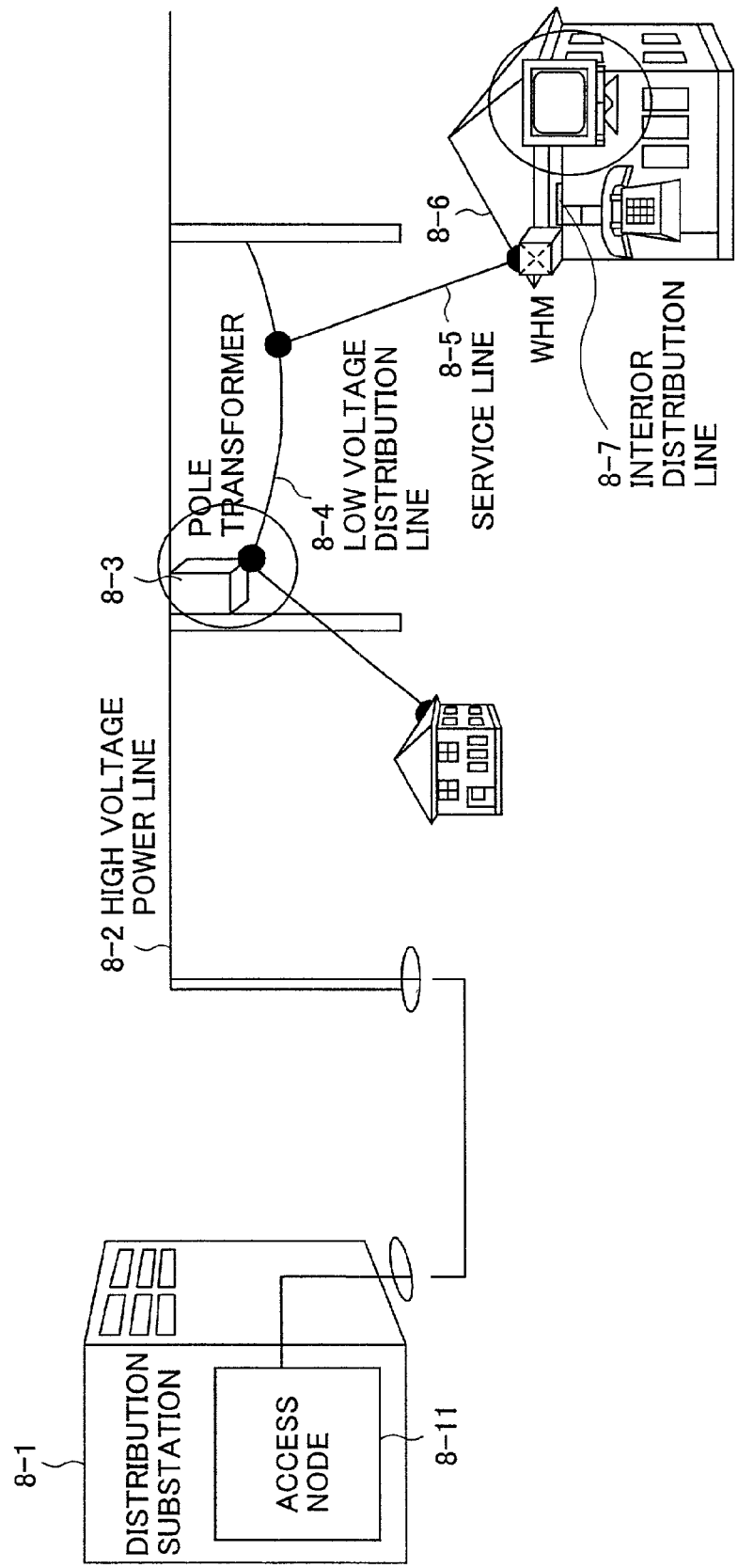
FIG. 1 shows a configuration example of a power line communication system.
Figure 2A:
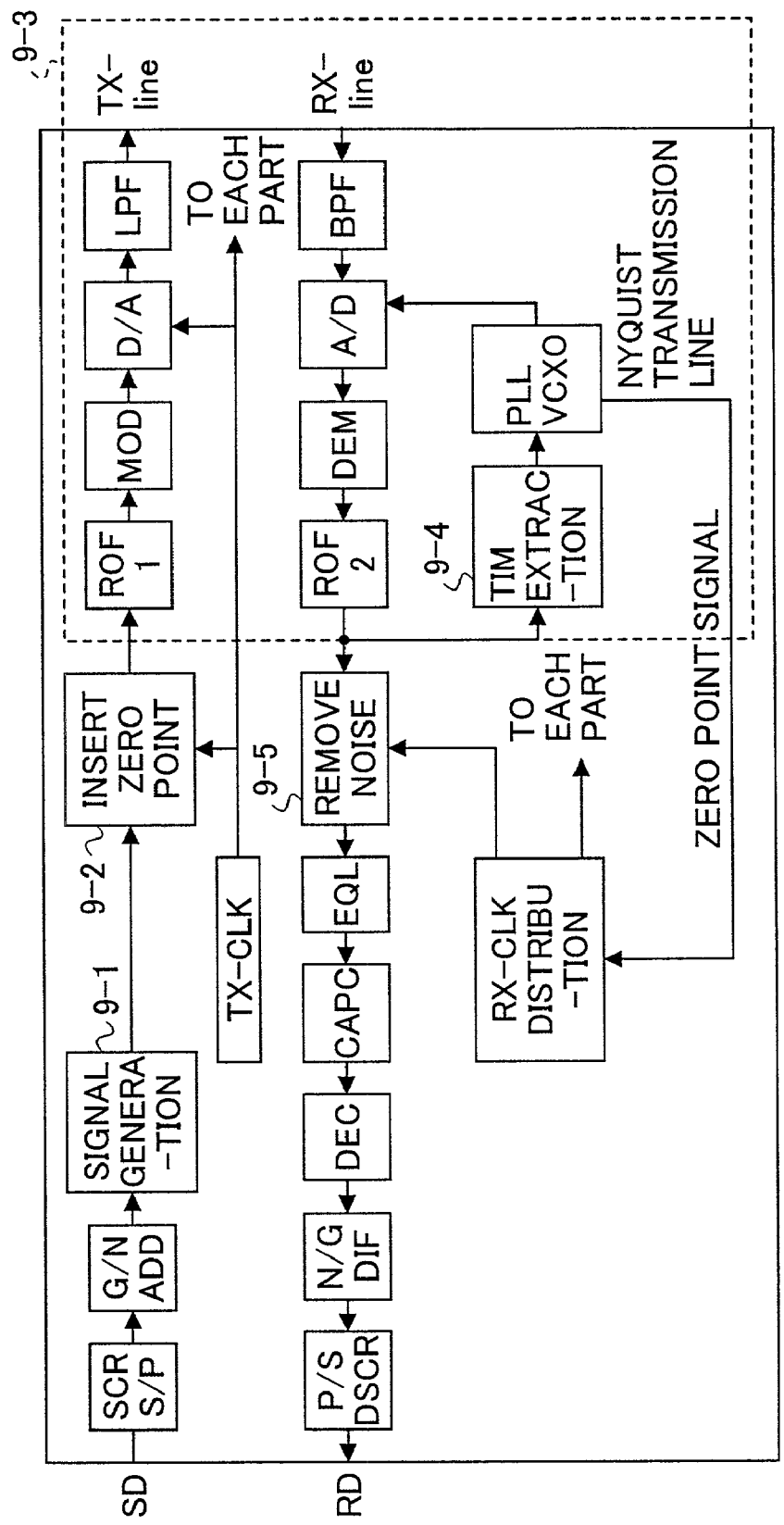
FIG. 2A shows an example of a configuration of a modem which cancels noise of low band (fixed band)

FIG. 2A shows an example of a configuration of a modem which cancels noise of the above-mentioned low band (fixed band). In the configuration shown in FIG. 2A, a scrambler (SCR S/R) scrambles a send signal (SD), converts the signal from serial to parallel and sends the signal to a vector adding circuit (G/N add).

The vector adding circuit (G/N add) converts the input parallel signals from gray binary code (G) to natural binary code (N). In addition, the vector adding circuit performs vector add operation which corresponds to a vector difference circuit (difference N/G) used for detecting a phase in the receive side, and sends the signal to a send signal generating part 9-1.

The send signal generating part 9-1 generates a send signal point which is represented by a vector. When sending the send signal, a zero point signal is inserted by a zero point inserting part 9-2, the waveform is shaped by a roll off filter (ROF1), the signal is modulated by a modulation circuit (MOD), and the digital signal is converted into an analog signal by a D/A conversion circuit. After that, a signal of low frequency band including frequency band (10 kHz-450 kHz) of the power line carrier is extracted by a low pass filter (LPF), and, then, the signal is sent to a send line (TX-line).

The send signal sent from the send line TX-line is received by an opposed modem from a receive line RX line. Then, a predetermined frequency band component (10-450 kHz when using the power line carrier modem) is extracted by the bandpass filter (BPF) and the signal is converted to a digital signal by an A/D conversion circuit (A/D). The analog signal which is represented digitally is demodulated into a base band signal by a demodulation circuit (DEM). The waveform is shaped by a roll off filter (ROF2) and the signal is sent to a timing extracting part (TIM). The output signal from the timing extracting part (TIM) 9-4 is sent to a VCXO (voltage controlled crystal oscillator) type phase lock loop circuit (PLL VCXO).

The VCXO type phase lock loop circuit (PLL VCXO) extracts the phase of zero point, and the phase signal of the zero point is provided to the A/D converter (A/D) as a sampling timing signal and to a clock distribution part (RX-CLK) in the receive part.

As for the output signal from the roll off filter (ROF2) of the receive part, noise component of transmission line is removed from a noise removing part 9-5, and interference between codes is removed by an equalizer (EQL). Then, phase is adjusted by an automatic carrier phase controller (CAPC), signal judgment of receive signal is performed by a judgment circuit (DEC), and, then, the judgment result is output to the vector difference circuit (difference N/G).

After the vector difference circuit (difference N/G) performs vector difference operation on the signal of natural binary code (N) sent by the send part wherein the vector difference operation is reverse to the operation of the vector adding circuit (G/N add), then, the vector difference circuit converts the signal to gray binary code (G) and sends it to a descrambler (P/S DSCR). The descrambler converts this parallel gray code into serial signals so that descrambler process is performed. Then, the signal is output as a receive signal (RD).

In the send part, a send clock distribution circuit (TX-CLK) distributes send clock to the zero point inserting part 9-2, a D/A converter (D/A) and other send circuit parts. In addition, in the receive part, a receive clock distribution part (RX-CLK) extracts receive clock from the VCXO type phase lock loop circuit (PLL VCXO), and distributes the receive clock to the noise removing part 9-5 and other receive circuit parts.

Figure 2B:
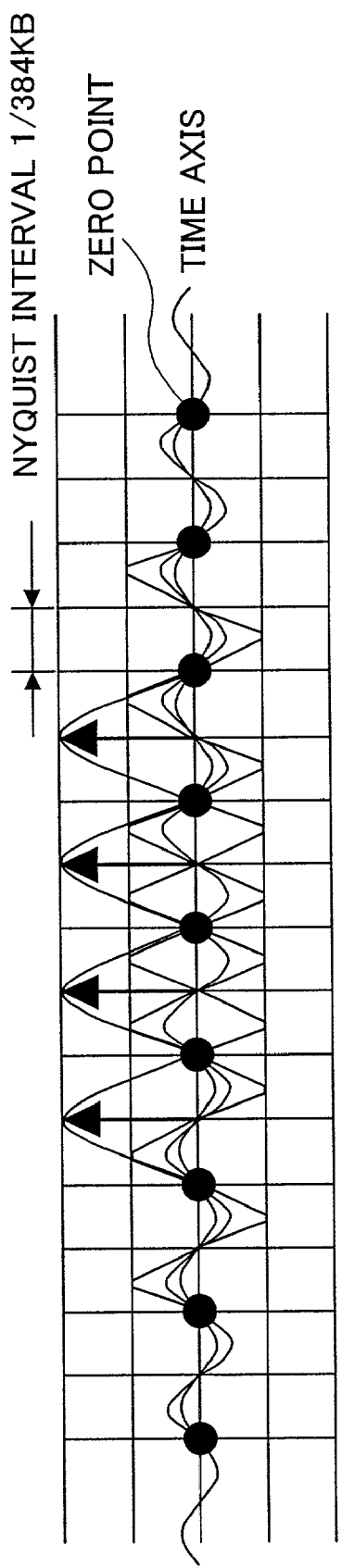
FIG. 2B is a figure for explaining a Nyquist transmission line.

The zero point phase signal extracted from the VCXO type phase lock loop circuit (PLL VCXO) only passes through the receive clock distribution circuit (RX-CLK). The zero point phase signal is simply a symbol timing signal. The part enclosed by a dotted line box is a Nyquist transmission line 9-3. As shown in FIG. 2B, the Nyquist transmission line 9-3 transparently sends a signal in which interval of signal points is more than the Nyquist interval (1/384 kB).

The above description is about the modem which cancels noise of the fixed band (low band). In this configuration, the equalizer (EQL) and the automatic carrier phase controller (CAPC) performs equalization processing by compensating for amplitude or phase of each frequency band signal assuming that transmission line characteristics are always constant.

However, the switching power source in the household electrical appliance repeats on-off in synchronization with power source frequency of 50/60 Hz so that load impedance is changed in synchronization with the power source frequency. Thus, the transmission line characteristics of the power line changes in synchronization with 50/60 Hz.

Figure 3A:
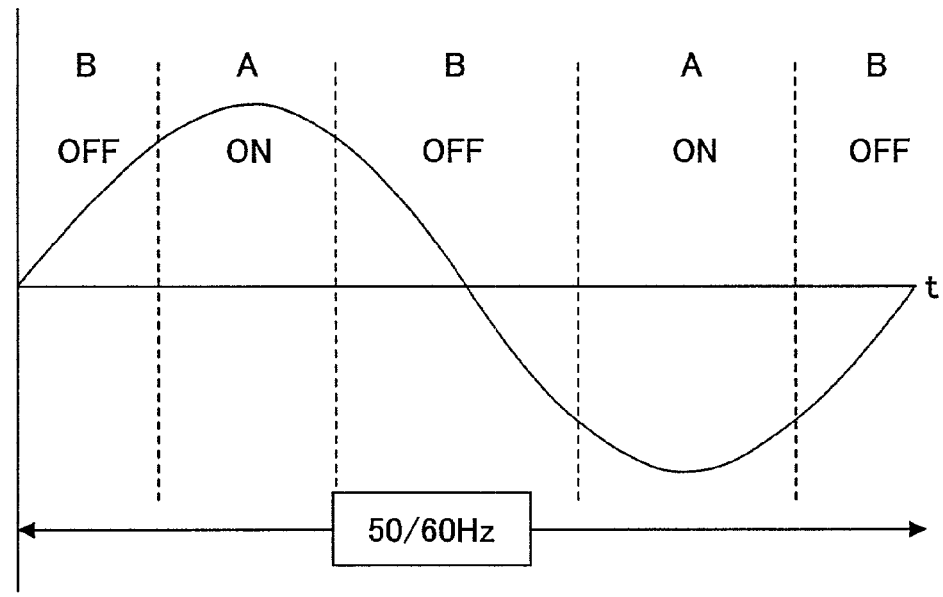
FIGS. 3A and 3B show power line transmission line characteristics which change due to on-off of internal elements of household electrical appliances.
Figure 3B:
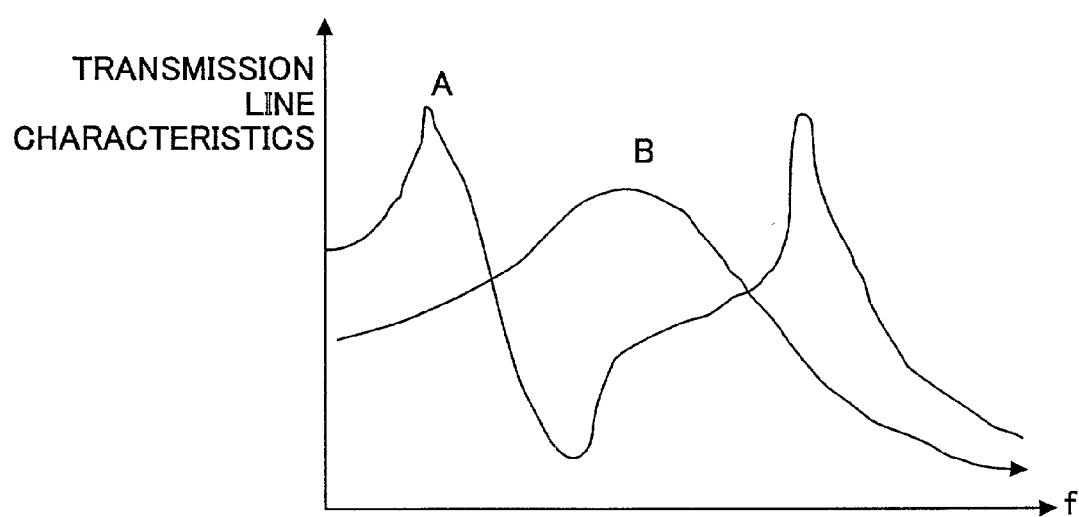

FIGS. 3A and 3B show the power line transmission line characteristics which change due to on-off of the internal element of the household electrical appliance. FIG. 3A shows one period of power source voltage of 50/60 Hz. The interval A in the one period shows a state of on and the interval B shows a state of off.

FIG. 3B shows transmission line characteristics of the interval A and B. As shown in FIG. 3B, the transmission line characteristics of the intervals A and B are largely different.

FIGS. 4A-4C show examples of signal points transmitted by the power line in which the transmission line characteristics changes periodically. FIG. 4A shows signal points (4 values) when sending a signal, FIG. 4B shows signal points of the interval A of "on" state and signal points of interval B of "off" state (4 values), and FIG. 4C shows receive signal points in which the receive signal points of the interval A and the interval B are combined. Since the amplitude and phase characteristics are different for the interval A and the interval B, the signal points of each of the intervals are different from original points of 4 values. Thus, when these points are displayed by an oscilloscope, signal points of eight values are displayed as shown in FIG. 4C.

As mentioned-above, due to periodic change of the transmission line characteristics by on-off of the switching elements, equalization process can not be performed accurately by the equalizer (EQL) and the automatic carrier phase controller (CAPC). As a result, frequency of judgment error of the receive signal increases.

In order to solve the above-mentioned problem, the present invention is contrived. In the following, a general outline of the present invention will be described.

In a method used in equalization processing of the present invention includes the steps of: extracting information on fluctuation of transmission line characteristics which fluctuate periodically on the basis of a receive signal; and performing equalization processing while switching equalization characteristics in accordance with the fluctuation of transmission line characteristics.

In the above-mentioned method, the step of extracting the information may include the steps of: receiving a reference signal which is sent from a send side; and detecting a change point of the transmission line characteristics by using fluctuation of phase or amplitude of the reference signal.

In addition, the above-mentioned method may includes the steps of: extracting a basic frequency signal of fluctuation period of the transmission line characteristics; vectorizing the basic frequency signal into a vector; adjusting phases of change point vectors corresponding to two change points such that the phases become symmetrical with respect to a reference phase; comparing a component of the vector of the basic frequency signal with a reference value; and outputting a switching signal for switching the equalization characteristics according to a result of the step of comparing.

Further, the above-mentioned method may includes the steps of: performing equalization processing for each interval of the fluctuation of transmission line characteristics on each corresponding receive signal; comparing errors of the each corresponding receive signal on which the equalization processing has been performed; and updating the reference value on the basis of a result of the step of comparing errors.

In the following, embodiments of the present invention will be described.

Figure 5:
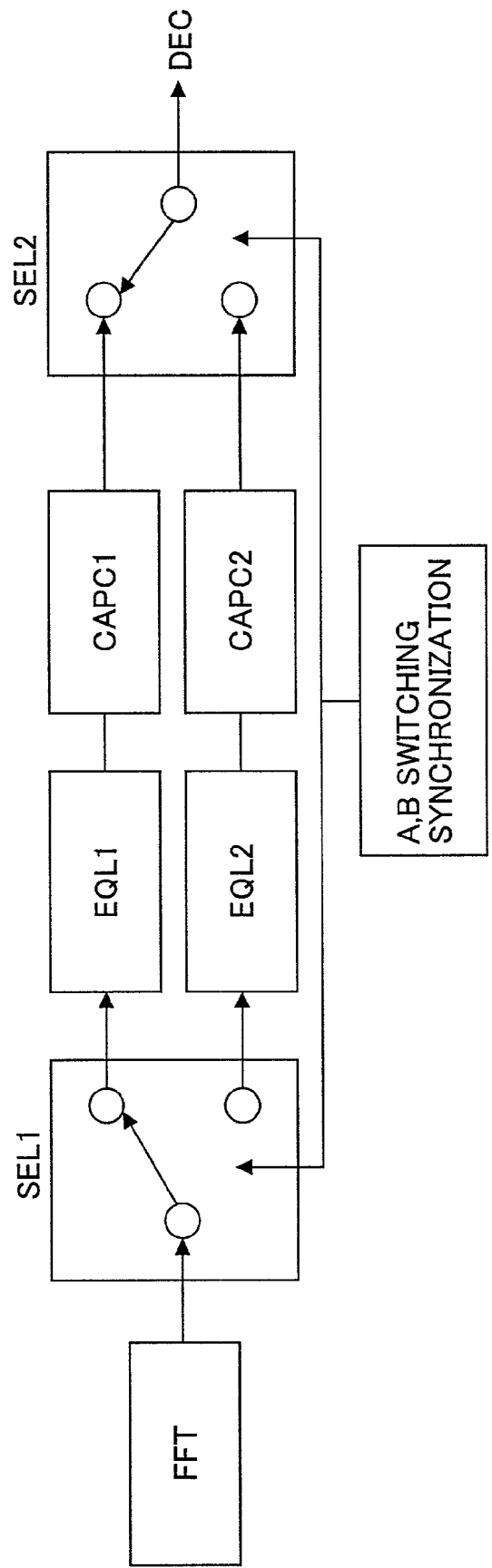
FIG. 5 shows a first embodiment of the present invention.

FIG. 5 shows a first embodiment of the present invention. The first embodiment includes two systems each of which includes an equalizer (EQL) and an automatic carrier phase controller (CAPC) wherein one system is switched to another system in synchronization with on-off period of the switching power source.

That is, an output from a frequency component output part FFT for outputting frequency component of the receive signal output from the noise removing part 9-5 is input into a first selection switch SEL1. The first selection switch SEL1 outputs the input signal to one of a first output terminal and a second output terminal in synchronization with a signal representing the before mentioned interval A or interval B.

A first equalizer EQL1 and a first automatic carrier phase controller CAPC1 are connected to the first output terminal of the first selection switch SEL1, and a second equalizer EQL2 and a second automatic carrier phase controller CAPC2 are connected to the second output terminal of the first selection switch SEL1.

Outputs of the first and second automatic carrier phase controllers CAPC1 and CAPC2 are sent to input terminals of the second selection switch SEL2. The second selection switch SEL2 selects one of input signals from the two input terminals and outputs the selected signal in synchronization with a signal indicating the interval A or the interval B.

FIG. 6 shows a second embodiment of the present invention. The second embodiment includes only one system of the equalizer EQL and the automatic carrier phase controller CAPC wherein parameters on equalization characteristics which are set in the equalizer EQL and the automatic carrier phase controller CAPC are changed in synchronization with a period of on-off of the switching power source.

That is, the output from the FFT is input to the one system of the equalizer EQL and the automatic carrier phase controller CAPC. In addition, equalization processing parameters for each of the interval A and the interval B are held, and an selection switch SEL is provided for selecting one of the parameters. The selection switch SEL selects one of the equalization processing parameters of the interval A and the interval B and sets the equalizer EQL and the automatic carrier phase controller CAPC by using the selected parameters in synchronization with switching period of the interval A and the interval B, so that equalization processing is performed optimally for each interval.

FIG. 7A shows a transmission frame configuration according to the present invention for detecting transmission line characteristic fluctuation. As shown in FIG. 7A, the transmission frame received and sent between the send part and the receive part is configured by one master frame including 128 sub-frames each being 1/4.8 kHz.

Figure 7B:
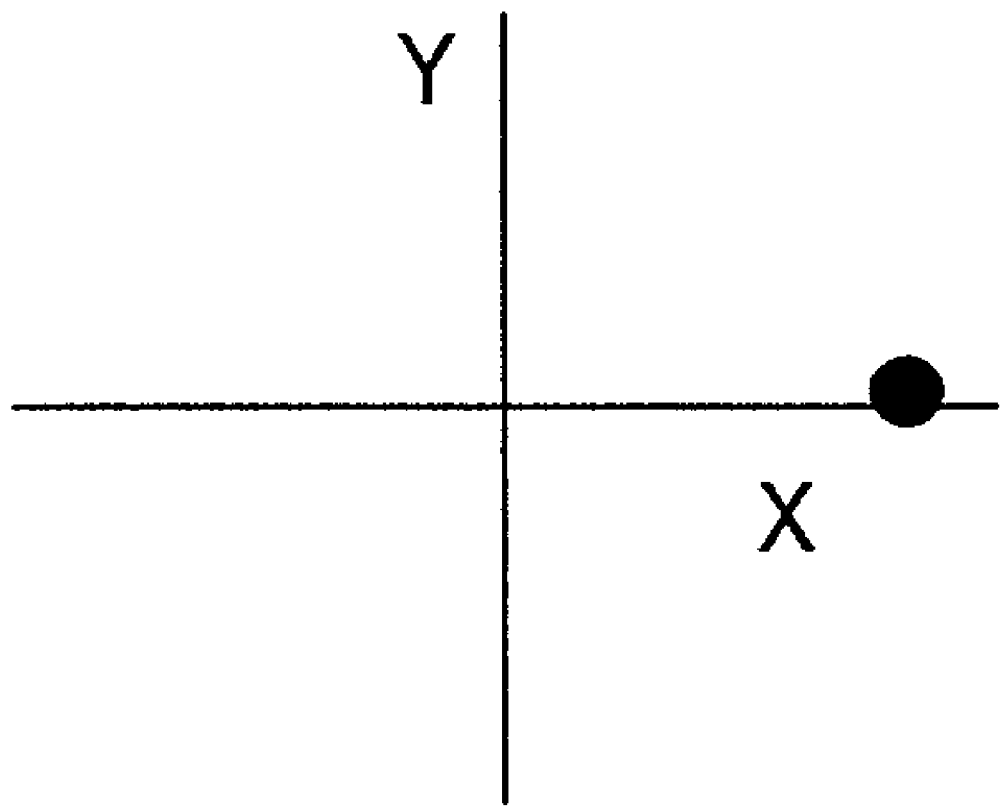
FIG. 7B shows a REF signal point.

Top sub-frame of the master frame is assigned as a no transmission energy (NTE) interval used for measuring noise distribution for removing noise. Data signals are assigned to the remaining 127 sub-frames. As shown in FIG. 7B, a reference (REF) signal is assigned to each channel (CH1-CH64) of each sub-frame in the 127 sub-frames in which amplitude and phase are predetermined for the reference signal. In the receive side, judgment for determining whether a current state is the interval A or the interval B is performed on the basis of received reference (REF) signal, and the equalizer is switched or the equalization processing parameters are set and updated in synchronization with the interval change.

The channel to which the reference (REF) signal is assigned is shifted for each sub-frame with respect to time so that the reference signal is distributed to each channel.

The channels CH1-CH64 shown in FIG. 7A correspond to each carrier in the multi-carrier modulation method. The number of assigned reference (REF) signals and interval for assigning the reference (REF) signals are determined properly according to accuracy for detecting fluctuation interval of the transmission line characteristics which depends on magnitude of transmission line characteristics fluctuation.

Figure 8:
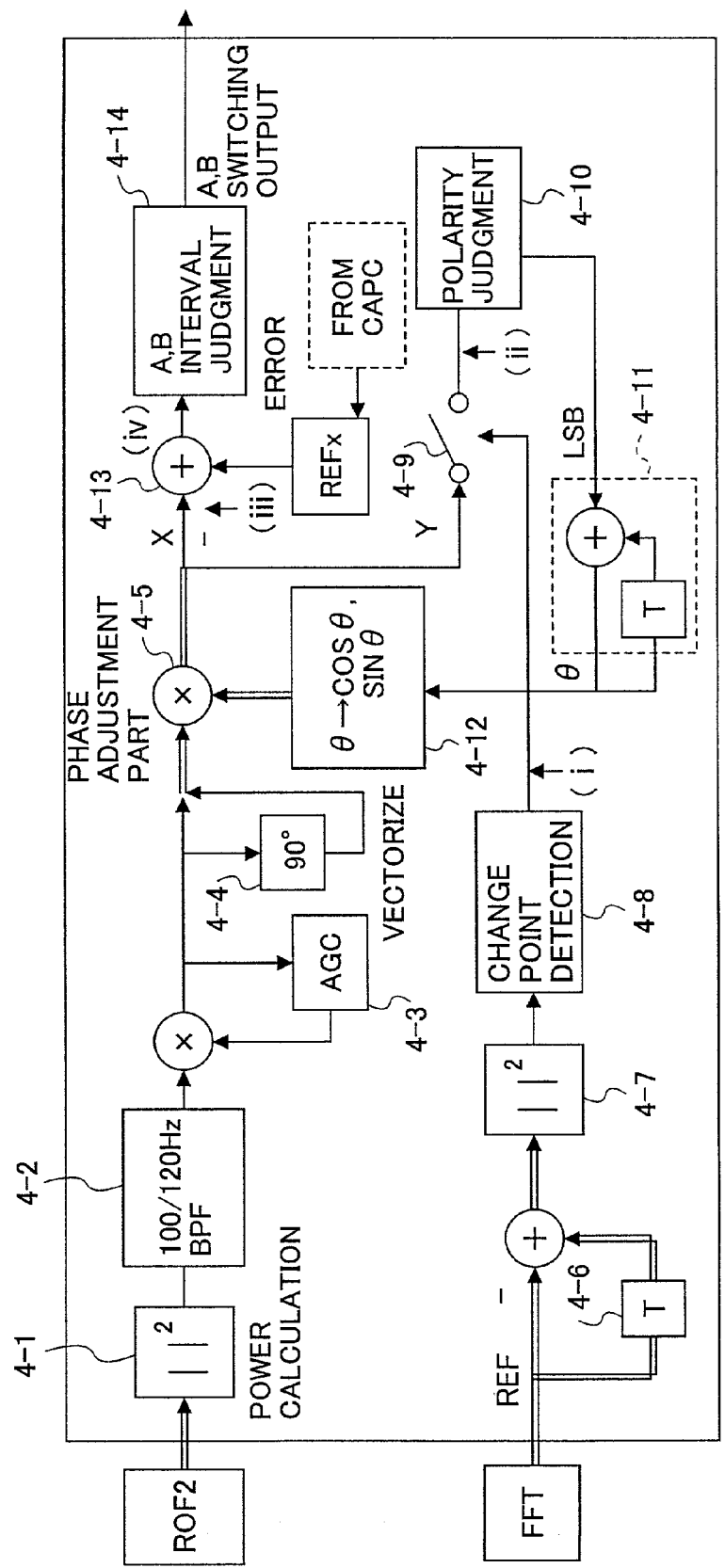
FIG. 8 shows a function block of a fluctuation period interval judgment part for judging the interval of fluctuation of the transmission line characteristics.

FIG. 8 shows a function block of a fluctuation period interval judgment part for judging the interval of fluctuation of the transmission line characteristics. In the fluctuation period interval judgment part, a power calculation part 4-1 converts an output signal of the roll off filter (ROF2) in the receive part shown in FIG. 2 into a scalar value. After that, a band-pass filter 4-2 extracts component including a frequency (100 Hz or 120 Hz) which is twice as high as power frequency of the power line, because the frequency becomes double by preferring square calculation by the power calculation part 4-1. The frequency becomes a basic frequency of the fluctuation period which causes fluctuation of transmission line characteristics. As the band-pass filter 4-2, a known secondary band-pass filter can be used.

An AGC circuit 4-3 performs automatic gain adjustment on an output signal of the band-pass filter 4-2. Then, the signal is combined with a signal which has been passed through a 90° phase delay circuit 4-4 so that the signal is vectorized. The phase of the vectorized signal of transmission line fluctuation period is adjusted by a phase adjustment part 4-5. This phase adjustment will be described later in detail.

The reference (REF) signals which are sent to each channel as shown in FIG. 7A from a send side is output from a fast Fourier transform (FFT) part which outputs receive signals of each channel of the receive part, and the signals are input to the fluctuation period interval judgment part of FIG. 8.

Figure 9A:
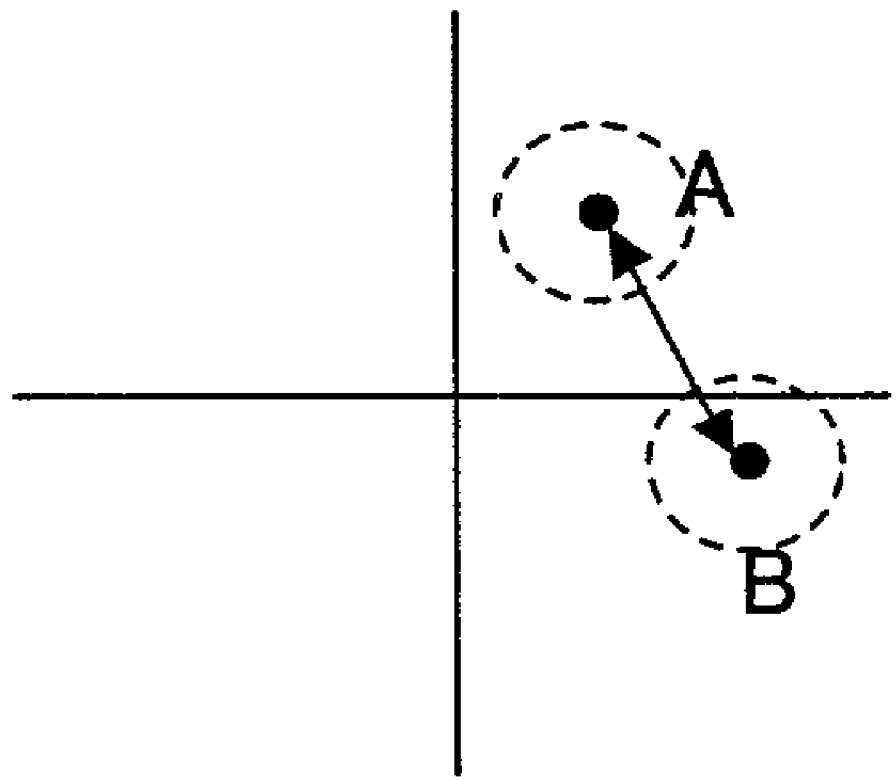
FIG. 9A shows a pulse signal representing change of receive point of the reference (REF) signal.

Since characteristics of the reference (REF) signal for the interval A and the reference (REF) signal for the interval B are different, phase and amplitude are different for the signals of the interval A and the interval B as shown in FIG. 9A.

In FIG. 8, difference operation is performed between the reference (REF) signal input from the fast Fourier transform (FFT) part and a signal passed through a delay circuit 4-6 so that change amount of the receive reference (REF) signal is detected. Then, a signal representing the change amount is squared by a power calculation part 4-7. After that, a change point detection part 4-8 outputs the signal as a pulse signal (i) representing the change point.

As shown in FIG. 9B, the pulse signal (i) representing the change point of the receive reference (REF) signal indicates timing when the transmission line characteristics change from the interval A to B or B to A. Since the master frame which includes the reference (REF) signal is 37.5 Hz, which is longer enough than half period of the power source frequency, change from A to B and B to A occurs in one master frame without exception. This change is detected by detecting a signal point in which phase and amplitude are different from those of a previous reference (REF) signal to some extent.

The output signal (i) of the change point detection part 4-8 is applied to a switch part 4-9 for controlling ON-OFF of the switch part. The switch part 4-9 extracts Y component of vector signal output from the phase adjustment part 4-5 at the time of change between the interval A to the interval B, that is, the switch part 4-9 extracts a signal (ii) representing phase component of the fluctuation period vector, and outputs the signal to a polarity judgment part 4-10.

The polarity judgment part 4-10 judges the polarity of the Y component (ii) of the vector signal, and outputs +1 or −1 to an integrator 4-11 according to the polarity. The integrator 4-11 integrates a signal representing the polarity, and outputs the integrated value to a sine/cosine calculation part 4-12. The sine/cosine calculation part 4-12 calculates a sine value SIN θ and a cosine vale COS θ in which the input integrated value is the phase angle θ. Conversion from the phase angle θ to the sine value SIN θ and the cosine value COS θ can be performed by the following equations which is based on series expansion.

$$COS\ θ = 1 - θ^2/2! + θ^4/4!$$

$$SIN\ θ = θ - θ^3/3! + θ^5/5!$$

The phase adjustment part 4-5 adjusts the phase angle θ on the basis of the integrated value of the polarity value of Y component of the fluctuation period signal vector such that the fluctuation period signal vector at the time of change from A to B and the fluctuation period signal vector at the time of change from B to A become symmetric with respect to X axis.

That is, if phases of the two fluctuation period signal vectors at the interval change point are shown as black points of FIG. 10A before the vectors are input to the phase adjustment part 4-5, the phases are adjusted by the phase adjustment part 4-5 such that the vectors become symmetric with respect to X axis as shown in FIG. 10B.

In FIG. 8, X component of the fluctuation period signal vector after phase adjustment is compared with an X component reference value REFx by a comparator 4-13. An interval judgment part 4-14 judges that the signal is in the interval A when the comparing result is (X-REFx)>0, and judges that the signal is in the interval B when (X-REFx)<0 as shown in FIG. 10C. Then, the interval judgment part 4-14 outputs a switching signal according to the judgment result.

The equalizer (EQL) and the automatic carrier phase controller (CAPC) perform equalization processing while switching equalization characteristics according to the switching signal output from the interval judgment part 4-14. When the judgment is not correct, that is, when the X component reference value REFx is deviated from a correct value, error (distance between the receive signal point and signal judgment point) of the interval A or the interval B becomes large.

Thus, width of interval is adjusted by updating the X component reference value REFx by judging which error is larger between the errors which occur in interval A and in interval B in the CAPC. For example, as shown in FIG. 10C, when the error is larger in the interval A, the X component reference value REFx is increased and the width of the interval A is decreased since the interval A is regarded to include a region of the interval B.

Figure 11:
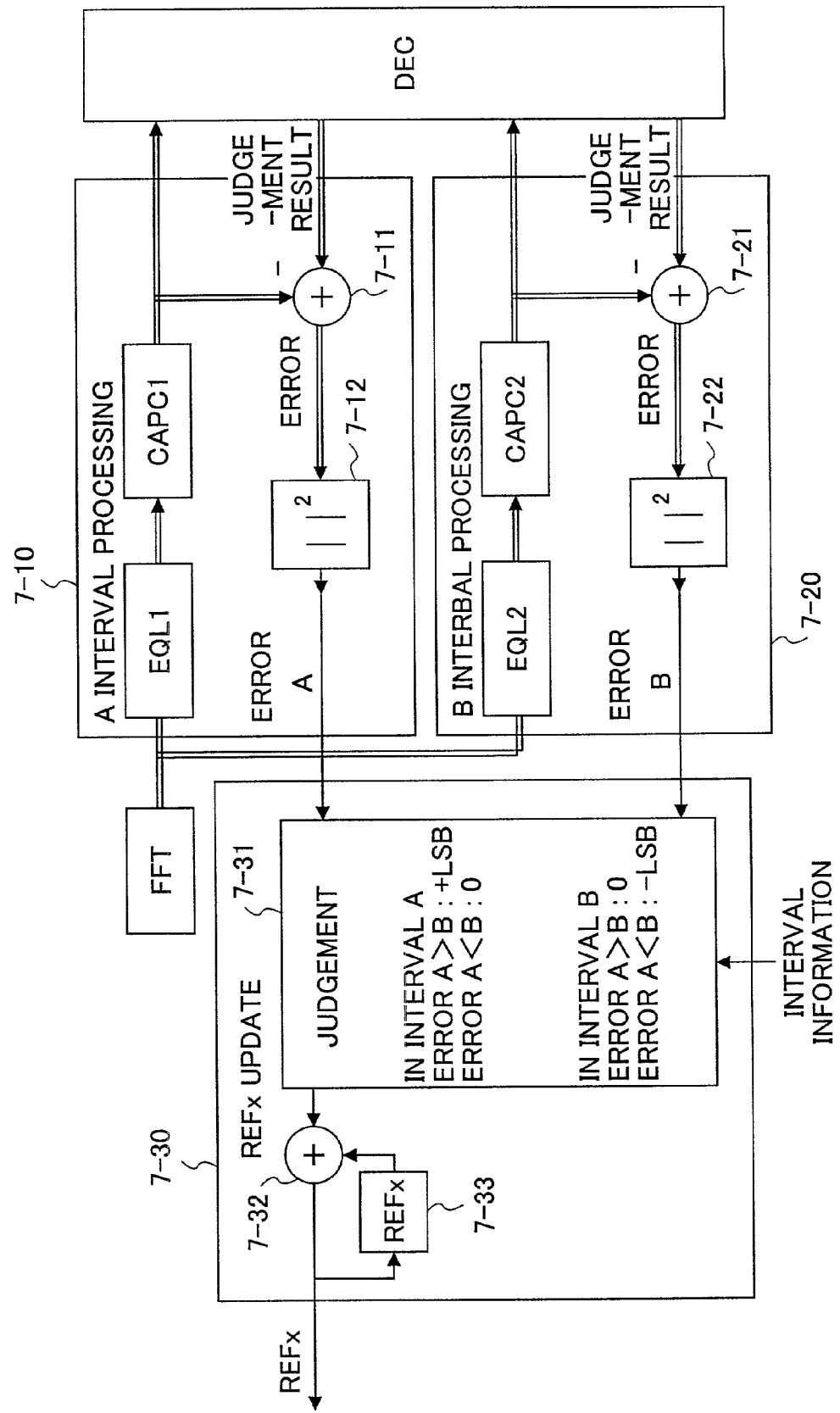
FIG. 11 shows a function block for updating the X component reference value REFx.

FIG. 11 shows a function block for updating the X component reference value REFx. As shown in the figure, data signals of each receive channel output from the fast Fourier transform part are applied to an A interval processing part 7-10 and a B interval processing part 7-20, wherein the A interval processing part includes a first equalizer (EQL1) and a first automatic carrier phase controller (CAPC1) for transmission line characteristics of interval A, and the B interval processing part includes a second equalizer (EQL2) and a second automatic carrier phase controller (CAPC2) for transmission line characteristics of interval B.

In each of the A interval processing part 7-10 and the B interval processing part 7-20, an equalized signal output from the phase controller (CAPC1, CAPC2) is compared with a signal on which receive signal judgment has been performed which is output from a judgment circuit (DEC) by a comparator (7-11, 7-12). Then, the difference is squared by a square operation part (7-12, 7-22) so that distance (error) between signals is calculated.

The distances between signals output from the A interval processing part 7-10 and the B interval processing part 7-20 are input into an X component reference value REFx updating part 7-30. In the X component reference value REFx updating part 7-30, an updating judgement part 7-31 judges whether current state is in the interval A or in the interval B on the basis of interval information output from the interval judgment part 4-14 shown in FIG. 8.

When current state is in the interval A and when the distance (error A) between signals output from the A interval processing part 7-10 is larger than the distance (error B) between signals output from the B interval processing part 7-20, the updating judgment part 7-31 outputs a signal for increasing a least significant bit (LSB) of the X component reference value REFx so that the the X component reference value REFx is increased.

When current state is in the interval A and when the distance (error A) between signals output from the A interval processing part 7-10 is smaller than the distance (error B) between signals output from the B interval processing part 7-20, the updating judgment part 7-31 outputs a signal for keeping the X component reference value REFx so that the X component reference value REFx is not updated.

When current state is in the interval B and when the distance (error A) between signals output from the A interval processing part 7-10 is larger than the distance (error B) between signals output from the B interval processing part 7-20, the updating judgment part 7-31 outputs a signal for keeping the X component reference value REFx so that the X component reference value REFx is not updated.

When current state is in the interval B and when the distance (error A) between signals output from the A interval processing part 7-10 is smaller than the distance (error B) between signals output from the B interval processing part 7-20, the updating judgment part 7-31 outputs a signal for decreasing a least significant bit (LSB) of the X component reference value REFx so that the X component reference value REFx is decreased.

The updating signal output from the updating judgment part 7-31 is applied to an adder 7-32. The adder 7-32 updates the X component reference value REFx by adding the updating signal to the X component reference value REFx held in the X component reference value holding part 7-33. Then, the updated X component reference value REFx is newly held in the X component reference value holding part 7-33 and the updated X component reference value REFx is output to the comparator 4-13 for comparing with X component of the fluctuation period signal vector shown in FIG. 8.

Although an embodiment has been described with reference to FIG. 8-FIG. 11 in which phase adjustment is performed such that the fluctuation period signal vector becomes symmetric with respect to X axis, and judgment of the interval A or the interval B is performed by judging whether X component of the adjusted fluctuation period signal vector exceeds a predetermined reference value REFx, the present invention is not limited to the embodiment. For example, an embodiment can be applied in which phase adjustment is performed such that the fluctuation period signal vector becomes symmetric with respect to Y axis, and judgment of the interval A or the interval B is performed by judging whether Y component of the adjusted fluctuation period signal vector exceeds a predetermined reference value REFx.

As mentioned above, according to the present invention, when transmission line characteristics change periodically due to on-off of switching power source of household electrical appliances in power line communication, fluctuation interval is judged and equalization processing is performed by switching equalization characteristics according to change of the interval of fluctuation period of the transmission line characteristics. Accordingly, equalization of receive signal can be performed properly so that receive accuracy can be improved. As a result, high speed transmission can be realized.

The present invention is not limited to the specifically disclosed embodiments, and variations and modifications may be made without departing from the scope of the invention.

What is claimed is:

1. A method used in equalization processing, comprising the steps of:
   receiving a reference signal from a transmission line, wherein said reference signal is sent from a send side and said reference signal has predetermined phase and amplitude in the send side;
   extracting, from said reference signal using fluctuation of phase and amplitude of said reference signal, fluctuation of transmission line characteristics which fluctuate periodically according to an on-off state of a switching element in an apparatus that is connected to the transmission line; and
   performing equalization processing while switching equalization characteristics in accordance with said fluctuation of transmission line characteristics.

2. The method as claimed in claim 1, said step of extracting said reference information comprising the steps of:
   detecting a change point of said transmission line characteristics by using fluctuation of phase or amplitude of said signal.

3. The method as claimed in claim 2, said method further comprising the steps of:
   extracting a basic frequency signal of fluctuation period of said transmission line characteristics;
   vectorizing said basic frequency signal into a vector;
   adjusting phases of change point vectors corresponding to two change points such that said phases become symmetrical with respect to a reference phase;
   comparing a component of said vector of said basic frequency signal with a reference value; and
   outputting a switching signal for switching said equalization characteristics according to a result of said step of comparing.

4. The method as claimed in claim 3, said method further comprising the steps of:
   performing equalization processing for each interval of said fluctuation of transmission line characteristics on each corresponding receive signal;
   comparing errors of said each corresponding receive signal on which said equalization processing has been performed; and
   updating said reference value on the basis of a result of said step of comparing errors.

5. An equalization processing apparatus comprising:
   a part receiving a reference signal from a transmission line, wherein said reference signal is sent from a send side and said reference signal has predetermined phase and amplitude in the send sidel
   a part extracting, from said reference signal using fluctuation of phase and amplitude of said reference signal, fluctuation of transmission line characteristics which fluctuate periodically according to an on-off state of a switching element in an apparatus that is connected to the transmission line; and
   a part performing equalization processing while switching equalization characteristics in accordance with said fluctuation of transmission line characteristics.

6. The equalization processing apparatus as claimed in claim 5, said part extracting said reference information comprising:
   a part detecting a change point of said transmission line characteristics by using fluctuation of phase or amplitude of said signal.

7. The equalization processing apparatus as claimed in claim 6, further comprising:

a part extracting a basic frequency signal of fluctuation period of said transmission line characteristics;

a part vectorizing said basic frequency signal into a vector;

a part adjusting phases of change point vectors corresponding to two change points such that said phases become symmetrical with respect to a reference phase;

a part comparing a component of said vector of said basic frequency signal with a reference value; and a part outputting a switching signal used for switching said equalization characteristics according to a result of comparing said component with said reference value.

8. The equalization processing apparatus as claimed in claim 7, further comprising:

a part performing equalization processing for each interval of said fluctuation of transmission line characteristics on each corresponding receive signal;

a part comparing errors of said each corresponding receive signal on which said equalization processing has been performed; and a part updating said reference value on the basis of a result of comparing said errors.

9. The equalization processing apparatus as claimed in claim 5, further comprising:

a plurality of equalization processing parts each corresponding different transmission line characteristics; and a part switching said equalization processing parts in accordance with fluctuation of said transmission line characteristics.

10. The equalization processing apparatus as claimed in claim 5, further comprising:

a part holding equalization processing parameters for different transmission line characteristics; and a part setting said equalization processing parameters corresponding to specific transmission line characteristics in accordance with said fluctuation of said transmission line characteristics.

* * * * *